US009515337B2

(12) United States Patent
Yoshimine

(10) Patent No.: US 9,515,337 B2
(45) Date of Patent: Dec. 6, 2016

(54) FUEL CELL MODULE

(71) Applicant: HONDA MOTOR CO., LTD., Tokyo (JP)

(72) Inventor: Yuki Yoshimine, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/438,346

(22) PCT Filed: Dec. 27, 2013

(86) PCT No.: PCT/JP2013/085354
§ 371 (c)(1),
(2) Date: Apr. 24, 2015

(87) PCT Pub. No.: WO2014/119223
PCT Pub. Date: Aug. 7, 2014

(65) Prior Publication Data
US 2015/0295260 A1 Oct. 15, 2015

(30) Foreign Application Priority Data
Jan. 30, 2013 (JP) .................................. 2013-016033

(51) Int. Cl.
*H01M 6/18* (2006.01)
*H01M 8/06* (2016.01)
(Continued)

(52) U.S. Cl.
CPC ............ *H01M 8/0618* (2013.01); *C01B 3/384* (2013.01); *H01M 8/04007* (2013.01); *H01M 8/04022* (2013.01); *H01M 8/0625* (2013.01); *H01M 8/0662* (2013.01); *H01M 8/1253* (2013.01); *H01M 8/24* (2013.01); *C01B 2203/0244* (2013.01); *C01B 2203/066* (2013.01); *C01B 2203/0811* (2013.01);
(Continued)

(58) Field of Classification Search
None
See application file for complete search history.

(56) References Cited

U.S. PATENT DOCUMENTS 9,240,601 B2 * 1/2016 Yoshimine ........ H01M 8/04291
2001/0009732 A1 7/2001 Schuler
(Continued)

FOREIGN PATENT DOCUMENTS

JP 2001-236980 8/2001
JP 2004-288434 10/2004
(Continued)

OTHER PUBLICATIONS

International Search Report, Date of mailing: Mar. 3, 2014.
Japanese Office Action with partial English translation dated Aug. 2, 2016, 4 pages.

*Primary Examiner* — Lucas J O Donnell
(74) *Attorney, Agent, or Firm* — Rankin, Hill & Clark LLP

(57) ABSTRACT

A fuel cell (FC) module includes a fuel cell stack and FC peripheral equipment. The fuel cell module includes a first area where an exhaust gas combustor and a start-up combustor are provided, an annular second area around the first area and where a reformer and a heat exchanger are provided, and an annular third area around the second area and where an evaporator is provided.

9 Claims, 13 Drawing Sheets

(51) Int. Cl.
 *C01B 3/38* (2006.01)
 *H01M 8/04* (2016.01)
 *H01M 8/24* (2016.01)
 *H01M 8/12* (2016.01)
(52) U.S. Cl.
 CPC *C01B 2203/0827* (2013.01); *C01B 2203/127* (2013.01); *C01B 2203/1288* (2013.01); *H01M 2008/1293* (2013.01); *H01M 2250/20* (2013.01); *Y02E 60/50* (2013.01); *Y02E 60/525* (2013.01); *Y02T 90/32* (2013.01)

(56) References Cited

U.S. PATENT DOCUMENTS

2007/0151152 A1* 7/2007 Mukai ..................... B01F 3/02
 48/127.9
2010/0021784 A1 1/2010 Fourmigue

FOREIGN PATENT DOCUMENTS

| | | |
|---|---|---|
| JP | 2007-294224 | 11/2007 |
| JP | 2010-504607 | 2/2010 |
| JP | 2011-096604 | 5/2011 |
| WO | 2013/114776 | 8/2013 |
| WO | 2013/161470 | 10/2013 |

* cited by examiner

Fuel Cell Module

TECHNICAL FIELD

The present invention relates to a fuel cell module including a fuel cell stack formed by stacking a plurality of fuel cells for generating electricity by electrochemical reactions of a fuel gas and an oxygen-containing gas.

BACKGROUND ART

Typically, a solid oxide fuel cell (SOFC) employs a solid electrolyte of ion-conductive solid oxide such as stabilized zirconia. The solid electrolyte is interposed between an anode and a cathode to form an electrolyte electrode assembly (hereinafter also referred to as MEA). The electrolyte electrode assembly is sandwiched between separators (bipolar plates). In use, generally, predetermined numbers of the electrolyte electrode assemblies and the separators are stacked together to form a fuel cell stack.

As a system including this fuel cell stack, for example, a fuel cell battery disclosed in Japanese Laid-Open Patent Publication No. 2001-236980 (hereinafter referred to as the conventional technique 1) is known. As shown in FIG. 11, the fuel cell battery includes a fuel cell stack 1a, and a heat insulating sleeve 2a is provided at one end of the fuel cell stack 1a. A reaction device 4a is provided in the heat insulating sleeve 2a. The reaction device 4a includes a heat exchanger 3a.

In the reaction device 4a, as a treatment of liquid fuel, partial oxidation reforming which does not use water is performed. After the liquid fuel is evaporated by an exhaust gas, the liquid fuel passes through a feeding point 5a which is part of the heat exchanger 3a. The fuel contacts an oxygen carrier gas heated by the exhaust gas thereby to induce partial oxidation reforming, and then, the fuel is supplied to the fuel cell stack 1a.

Further, as shown in FIG. 12, a solid oxide fuel cell disclosed in Japanese Laid-Open Patent Publication No. 2010-504607 (PCT) (hereinafter referred to as the conventional technique 2) has a heat exchanger 2b including a cell core 1b. The heat exchanger 2b heats the cathode air utilizing waste heat.

Further, as shown in FIG. 13, a fuel cell system disclosed in Japanese Laid-Open Patent Publication No. 2004-288434 (hereinafter referred to as the conventional technique 3) includes a first area 1c having a circular cylindrical shape extending vertically, and an annular second area 2c around the first area 1c, an annular third area 3c around the second area 2c, and an annular fourth area 4c around the third area 3c.

A burner 5c is provided in the first area 1c, and a reforming pipe 6c is provided in the second area 2c. A water evaporator 7c is provided in the third area 3c, and a CO shift converter 8c is provided in the fourth area 4c.

SUMMARY OF INVENTION

In the conventional technique 1, at the time of reforming by partial oxidation in the reaction device 4a, heat of the exhaust gas is used for heating the liquid fuel and the oxygen carrier gas. Therefore, the quantity of heat energy for raising the temperature of the oxygen-containing gas supplied to the fuel cell stack 1a tends to be inefficient, and the efficiency is low.

Further, in the conventional technique 2, in order to increase heat efficiency, long flow channels are adopted to have a sufficient heat transmission area. Therefore, considerably large pressure losses tend to occur.

Further, in the conventional technique 3, radiation of the heat from the central area having the highest temperature is suppressed using heat insulation material (partition wall). Therefore, heat cannot be recovered, and the efficiency is low.

The present invention has been made to solve the problems of this type, and an object of the present invention is to provide a fuel cell module having simple and compact structure in which it is possible to achieve improvement in the heat efficiency and facilitation of thermally self-sustaining operation.

The present invention relates to a fuel cell module including a fuel cell stack formed by stacking a plurality of fuel cells for generating electricity by electrochemical reactions of a fuel gas and an oxygen-containing gas, a reformer for reforming a mixed gas of a raw fuel chiefly containing hydrocarbon and water vapor to produce the fuel gas supplied to the fuel cell stack, an evaporator for evaporating water, and supplying the water vapor to the reformer, a heat exchanger for raising the temperature of the oxygen-containing gas by heat exchange with a combustion gas, and supplying the oxygen-containing gas to the fuel cell stack, an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas, and a start-up combustor for combusting the raw fuel and the oxygen-containing gas to produce the combustion gas.

The fuel cell module includes a first area where the exhaust gas combustor and the start-up combustor are provided, an annular second area around the first area and where the reformer and the heat exchanger are provided, and an annular third area around the second area and where the evaporator is provided.

In the present invention, the first area including the exhaust gas combustor and the start-up combustor is centrally-located. The annular second area is successively provided around the first area, and the annular third area is then provided around the second area. The reformer and the heat exchanger are provided in the second area, and the evaporator is provided in the third area.

In the structure, heat waste and heat radiation are suppressed suitably. Thus, improvement in the heat efficiency is achieved, and thermally self-sustaining operation is facilitated. Further, simple and compact structure of the fuel cell module as a whole is achieved.

The above and other objects, features and advantages of the present invention will become more apparent from the following description when taken in conjunction with the accompanying drawings in which preferred embodiments of the present invention are shown by way of illustrative example.

DESCRIPTION OF EMBODIMENTS

Figure 1:
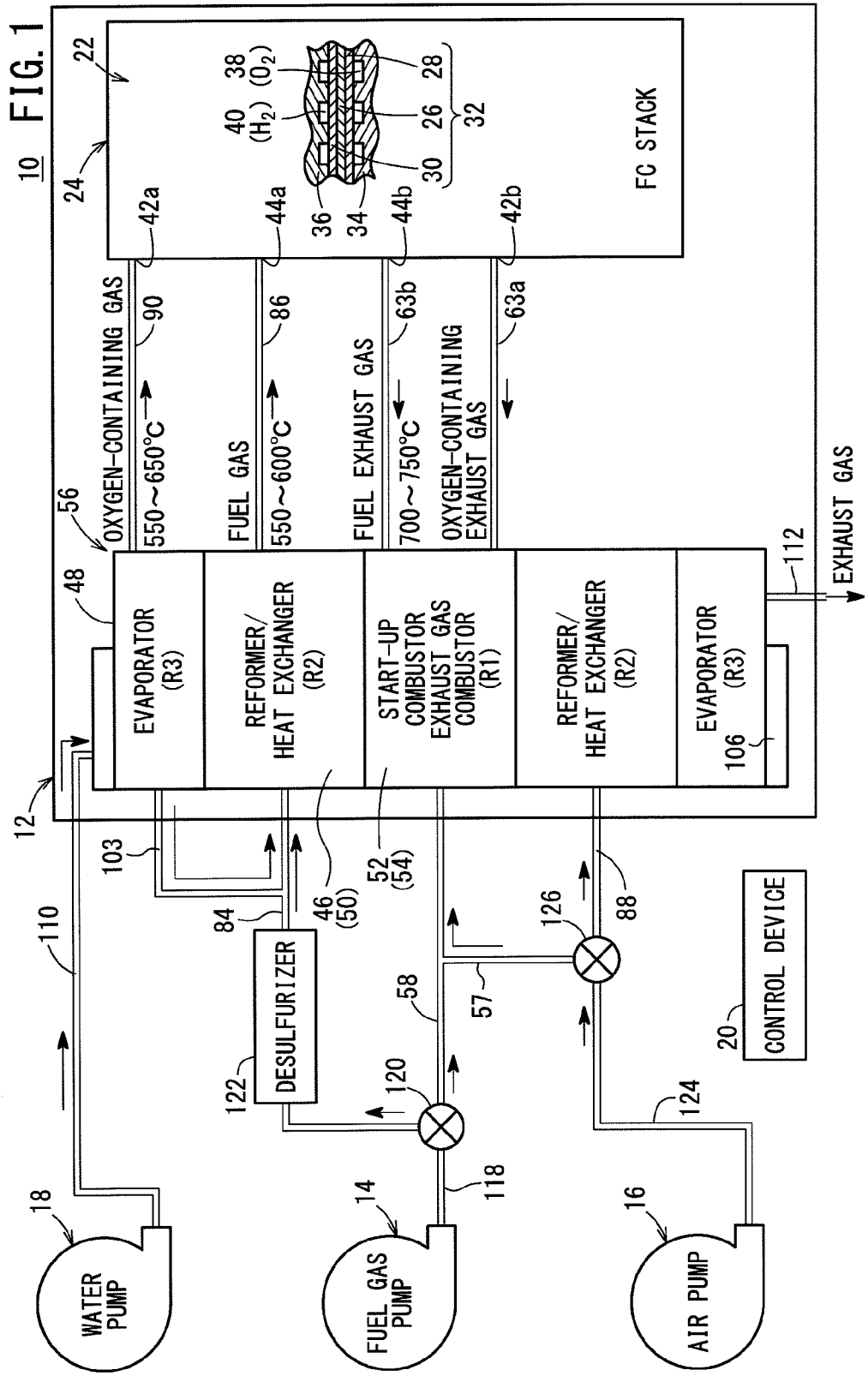
FIG. 1 is a diagram schematically showing structure of a fuel cell system including a fuel cell module according to a first embodiment of the present invention.

As shown in FIG. 1, a fuel cell system 10 includes a fuel cell module 12 according to a first embodiment of the present invention, and the fuel cell system 10 is used in various applications, including stationary and mobile applications. For example, the fuel cell system 10 is mounted on a vehicle.

The fuel cell system 10 includes the fuel cell module (SOFC module) 12 for generating electrical energy in power generation by electrochemical reactions of a fuel gas (a gas produced by mixing a hydrogen gas, methane, and carbon monoxide) and an oxygen-containing gas (air), a raw fuel supply apparatus (including a fuel gas pump) 14 for supplying a raw fuel (e.g., city gas) to the fuel cell module 12, an oxygen-containing gas supply apparatus (including an air pump) 16 for supplying the oxygen-containing gas to the fuel cell module 12, a water supply apparatus (including a water pump) 18 for supplying water to the fuel cell module 12, and a control device 20 for controlling the amount of electrical energy generated in the fuel cell module 12.

The fuel cell module 12 includes a solid oxide fuel cell stack 24 formed by stacking a plurality of solid oxide fuel cells 22 in a vertical direction (or horizontal direction). The fuel cell 22 includes an electrolyte electrode assembly (MEA) 32. The electrolyte electrode assembly 32 includes a cathode 28, an anode 30, and an electrolyte 26 interposed between the cathode 28 and the anode 30. For example, the electrolyte 26 is made of ion-conductive solid oxide such as stabilized zirconia.

A cathode side separator 34 and an anode side separator 36 are provided on both sides of the electrolyte electrode assembly 32. An oxygen-containing gas flow field 38 for supplying the oxygen-containing gas to the cathode 28 is formed in the cathode side separator 34, and a fuel gas flow field 40 for supplying the fuel gas to the anode 30 is formed in the anode side separator 36. As the fuel cell 22, various types of conventional SOFCs can be adopted.

The operating temperature of the fuel cell 22 is high, that is, at several hundred ° C. Methane in the fuel gas is reformed at the anode 30 to obtain hydrogen and CO, and the hydrogen and CO are supplied to a portion of the electrolyte 26 adjacent to the anode 30.

An oxygen-containing gas supply passage 42a, an oxygen-containing gas discharge passage 42b, a fuel gas supply passage 44a, and a fuel gas discharge passage 44b extend through the fuel cell stack 24. The oxygen-containing gas supply passage 42a is connected to an inlet of each oxygen-containing gas flow field 38, the oxygen-containing gas discharge passage 42b is connected to an outlet of each oxygen-containing gas flow field 38, the fuel gas supply passage 44a is connected to an inlet of each fuel gas flow field 40, and the fuel gas discharge passage 44b is connected to an outlet of each fuel gas flow field 40.

The fuel cell module 12 includes a reformer 46 for reforming a mixed gas of a raw fuel chiefly containing hydrocarbon (e.g., city gas) and water vapor to produce a fuel gas supplied to the fuel cell stack 24, an evaporator 48 for evaporating water and supplying the water vapor to the reformer 46, a heat exchanger 50 for raising the temperature of the oxygen-containing gas by heat exchange with a combustion gas, and supplying the oxygen-containing gas to the fuel cell stack 24, an exhaust gas combustor 52 for combusting the fuel gas discharged from the fuel cell stack 24 as a fuel exhaust gas and the oxygen-containing gas discharged from the fuel cell stack 24 as an oxygen-containing exhaust gas to produce the combustion gas, and a start-up combustor 54 for combusting the raw fuel and the oxygen-containing gas to produce the combustion gas.

Figure 2:
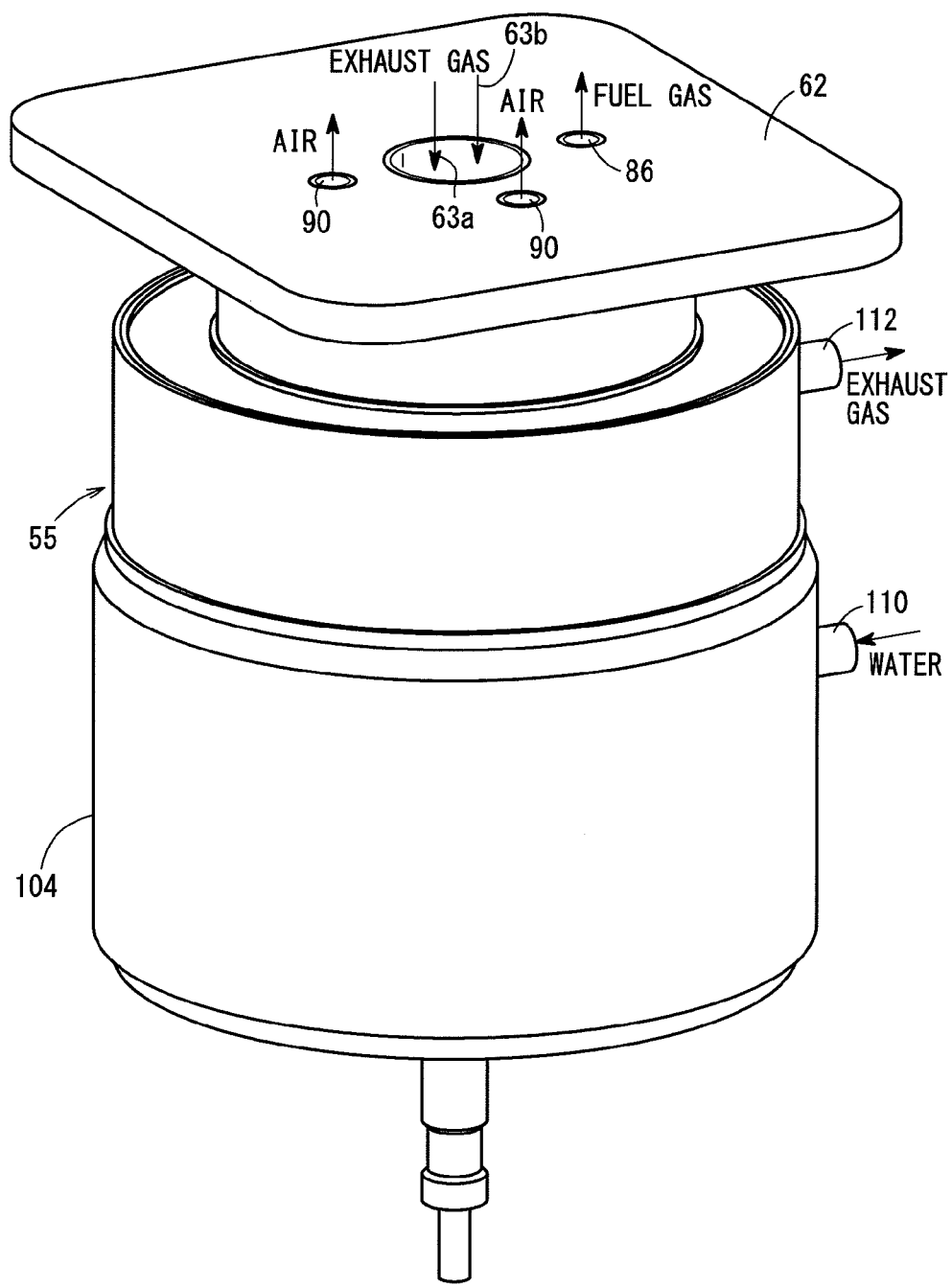
FIG. 2 is a perspective view showing FC peripheral equipment of the fuel cell module.

Basically, the fuel cell module 12 is made up of the fuel cell stack 24 and FC (fuel cell) peripheral equipment (BOP) 56 (see FIGS. 1 and 2). The FC peripheral equipment 56 includes the reformer 46, the evaporator 48, the heat exchanger 50, the exhaust gas combustor 52, and the start-up combustor 54.

Figure 3:
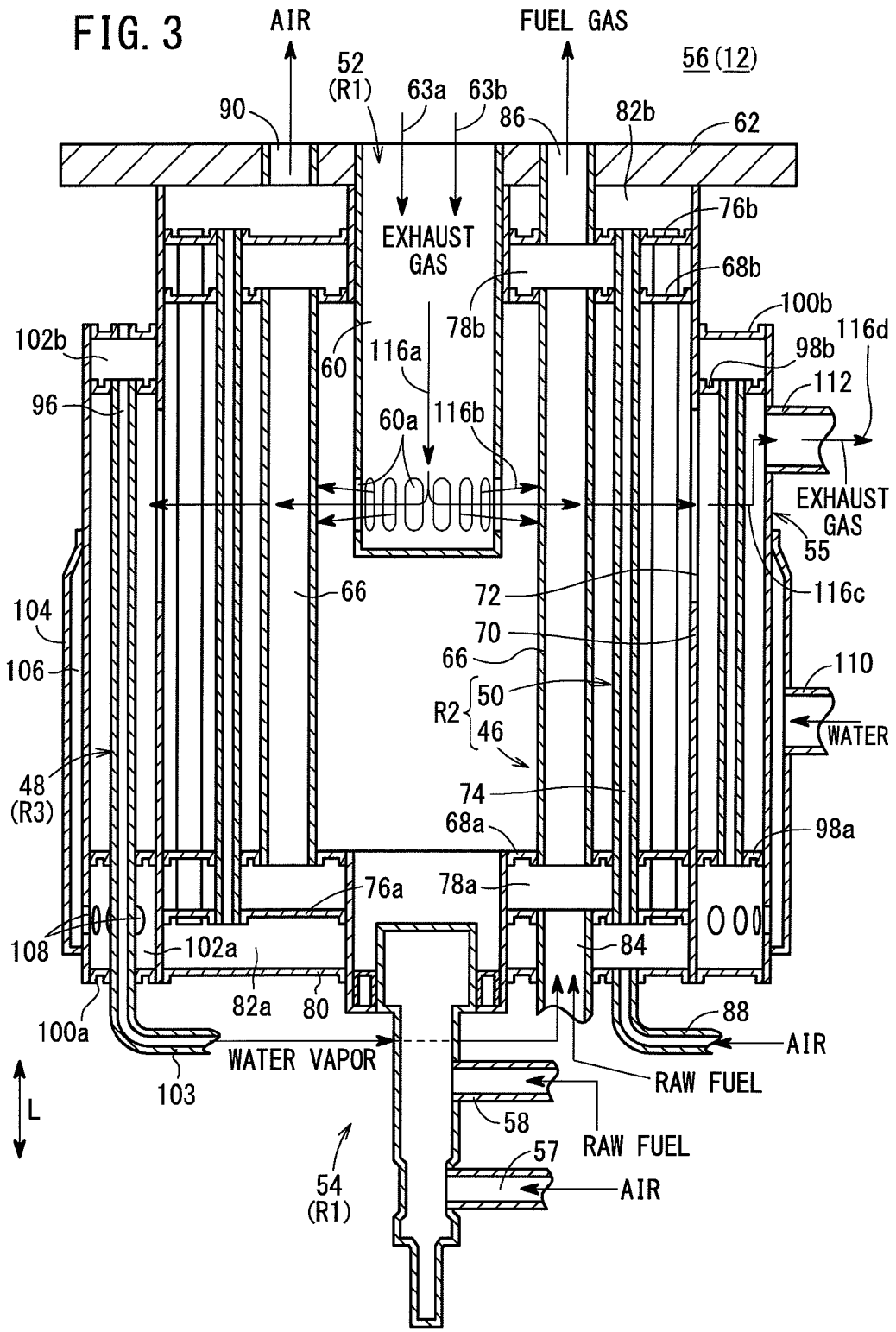
FIG. 3 is a cross sectional view showing the FC peripheral equipment.
Figure 4:
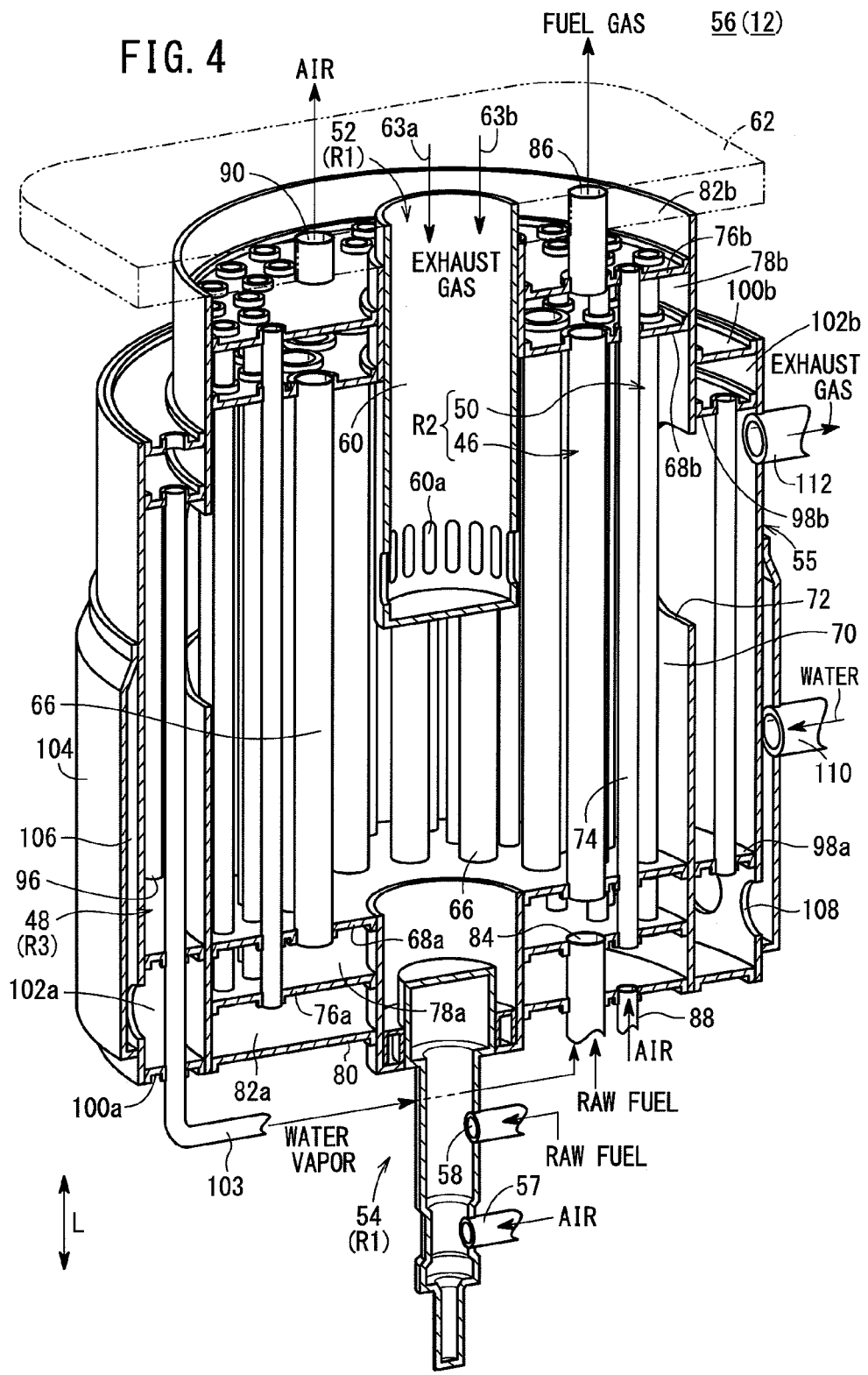
FIG. 4 is a perspective view with partial omission showing the FC peripheral equipment.
Figure 5:
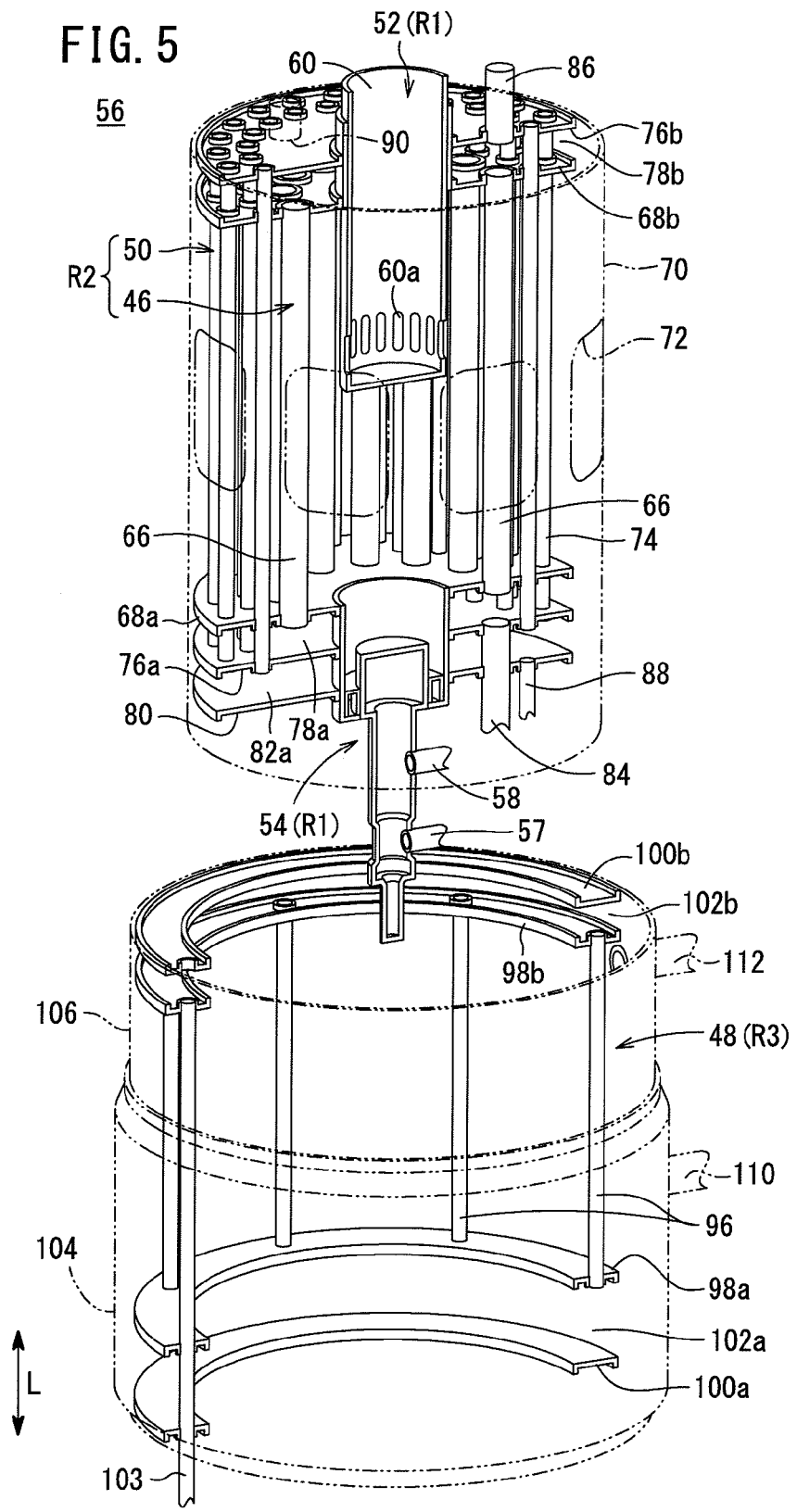
FIG. 5 is an exploded perspective view showing main components of the FC peripheral equipment.

As shown in FIGS. 3 to 5, the FC peripheral equipment 56 includes a first area R1 where the exhaust gas combustor 52 and the start-up combustor 54 are provided, an annular second area R2 formed around the first area R1 and where the reformer 46 and the heat exchanger 50 are provided, an annular third area R3 formed around the second area R2 and where the evaporator 48 is provided. A cylindrical outer member 55 constituting an outer wall is provided on the outer peripheral side of the third area R3.

The start-up combustor 54 includes an air supply pipe 57 and a raw fuel supply pipe 58. The start-up combustor 54 has an ejector function, and generates negative pressure in the raw fuel supply pipe 58 by the flow of the air supplied from the air supply pipe 57 for sucking the raw fuel.

The exhaust gas combustor 52 is spaced away from the start-up combustor 54, and includes a combustion cup 60 formed in a shape of a cylinder having a bottom. A plurality of holes (e.g., circular holes or rectangular holes) 60a are formed along the outer circumference of the marginal end of the combustion cup 60 on the bottom side. A stack attachment plate 62 is engaged with the other end of the combustion cup 60 on the opening side. The fuel cell stack 24 is attached to the stack attachment plate 62.

One end of an oxygen-containing exhaust gas channel 63a and one end of a fuel exhaust gas channel 63b are provided at the combustion cup 60. The combustion gas is produced inside the combustion cup 60 by combustion reaction of the fuel gas (more specifically, fuel exhaust gas) and the oxygen-containing gas (more specifically, oxygen-containing exhaust gas).

As shown in FIG. 1, the other end of the oxygen-containing exhaust gas channel 63a is connected to the oxygen-containing gas discharge passage 42b of the fuel cell stack 24, and the other end of the fuel exhaust gas channel 63b is connected to the fuel gas discharge passage 44b of the fuel cell stack 24.

As shown in FIGS. 3 to 5, the reformer 46 is a preliminary reformer for reforming higher hydrocarbon ($C_{2+}$) such as ethane ($C_2H_6$), propane ($C_3H_8$), and butane ($C_4H_{10}$) in the city gas (raw fuel) to produce the fuel gas chiefly containing methane ($CH_4$), hydrogen, and CO by steam reforming. The operating temperature of the reformer 46 is set at several hundred ° C.

The reformer 46 includes a plurality of reforming pipes (heat transmission pipes) 66 provided around the exhaust gas combustor 52 and the start-up combustor 54. Each of the reforming pipes 66 is filled with reforming catalyst pellets (not shown). Each of the reforming pipes 66 has one end (lower end) fixed to a first lower ring member 68a, and the other end (upper end) fixed to a first upper ring member 68b.

The outer circumferential portions of the first lower ring member 68a and the first upper ring member 68b are fixed to the inner circumferential portion of a cylindrical member 70 by welding or the like. The inner circumferential portions of the first lower ring member 68a and the first upper ring member 68b are fixed to the outer circumferential portions of the exhaust gas combustor 52 and the start-up combustor 54 by welding or the like. The cylindrical member 70 extends in an axial direction indicated by an arrow L, and an end of the cylindrical member 70 adjacent to the fuel cell stack 24 is fixed to the stack attachment plate 62. A plurality of openings 72 are formed in the outer circumference of the cylindrical member 70 in a circumferential direction at predetermined height positions.

Figure 6:
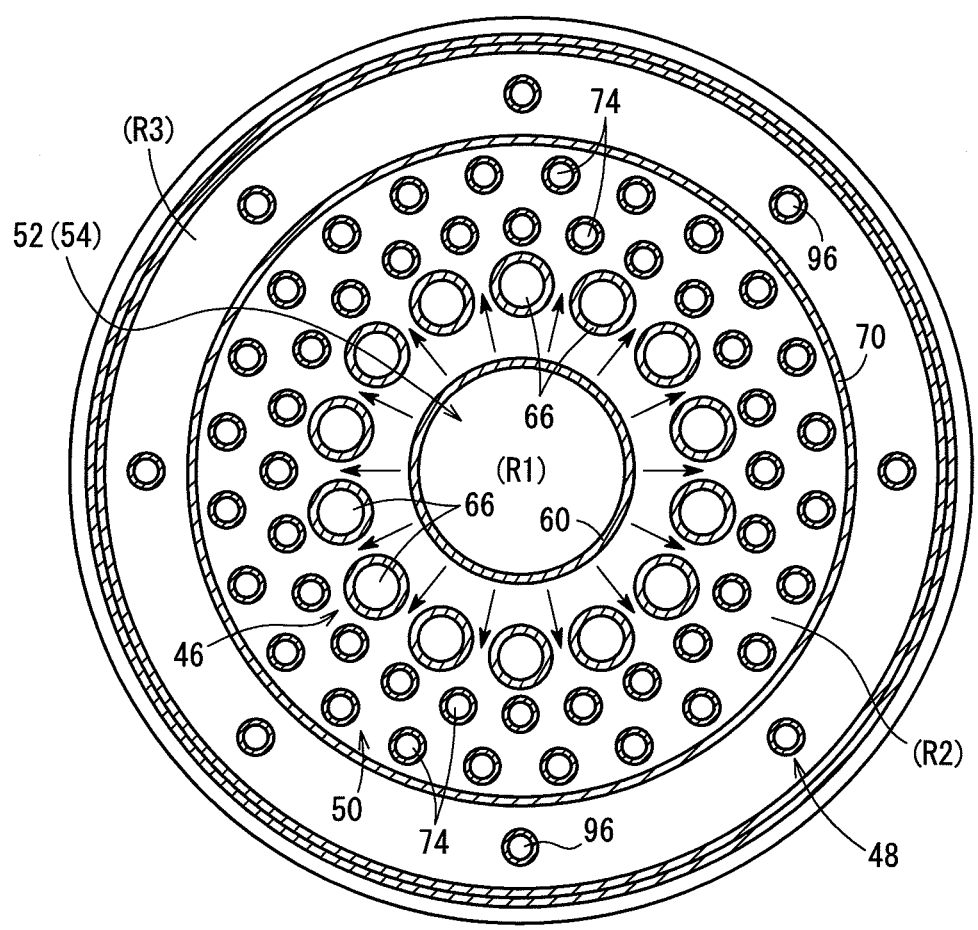
FIG. 6 is a cross sectional view showing the FC peripheral equipment.

The heat exchanger 50 has heat exchange pipes (heat transmission pipes) 74 provided adjacent to and outside the reforming pipes 66 of the reformer 46 (i.e., radially outwardly of the reformer 46). As shown in FIG. 6, the reforming pipes 66 are arranged at equal intervals on a virtual circle, concentrically around the first area R1. The heat exchange pipes 74 are arranged at equal intervals on two inner and outer virtual circles, concentrically around the first area R1 outside the reforming pipes 66. The heat exchange pipes 74 arranged on the inner virtual circle and the heat exchange pipes 74 arranged on the outer virtual circle are offset from each other (i.e., arranged in a zigzag pattern).

As shown in FIGS. 3 and 4, each of the heat exchange pipes 74 has one end (lower end) which is fixed to a second lower ring member 76a by welding or the like, and the other end (upper end) which is fixed to a second upper ring member 76b by welding or the like. The outer circumferential portions of the second lower ring member 76a and the second upper ring member 76b are fixed to the inner circumferential portion of the cylindrical member 70 by welding or the like. The inner circumferential portions of the second lower ring member 76a and the second upper ring member 76b are fixed to the outer circumferential portions of the exhaust gas combustor 52 and the start-up combustor 54 by welding or the like.

The second lower ring member 76a is positioned below the first lower ring member 68a (i.e., outside the first lower ring member 68a in the axial direction), and the second upper ring member 76b is positioned above the first upper ring member 68b (i.e., outside the first upper ring member 68b in the axial direction).

An annular mixed gas supply chamber 78a is formed between the first lower ring member 68a and the second lower ring member 76a, and a mixed gas of raw fuel and water vapor is supplied to the mixed gas supply chamber 78a. Further, an annular fuel gas discharge chamber 78b is formed between the first upper ring member 68b and the second upper ring member 76b, and the produced fuel gas (reformed gas) is discharged to the fuel gas discharge chamber 78b. Both ends of each of the reforming pipes 66 are opened to the mixed gas supply chamber 78a and the fuel gas discharge chamber 78b.

A ring shaped end ring member 80 is fixed to an end of the cylindrical member 70 on the start-up combustor 54 side by welding or the like. An annular oxygen-containing gas supply chamber 82a is formed between the end ring member 80 and the second lower ring member 76a, and the oxygen-containing gas is supplied to the oxygen-containing gas supply chamber 82a. An annular oxygen-containing gas discharge chamber 82b is formed between the second upper ring member 76b and the stack attachment plate 62, and the heated oxygen-containing gas is discharged to the oxygen-containing gas discharge chamber 82b. Both ends of each of the heat exchange pipes 74 are opened to the oxygen-containing gas supply chamber 82a and the oxygen-containing gas discharge chamber 82b.

The fuel gas discharge chamber 78b and the oxygen-containing gas discharge chamber 82b are provided in a double deck manner, and the fuel gas discharge chamber 78b is provided on the inner side with respect to the oxygen-containing gas discharge chamber 82b in the axial direction (i.e., below the oxygen-containing gas discharge chamber 82b). The mixed gas supply chamber 78a and the oxygen-containing gas supply chamber 82a are provided in a double deck manner, and the mixed gas supply chamber 78a is provided on the inner side with respect to the oxygen-containing gas supply chamber 82a in the axial direction (i.e., above the oxygen-containing gas supply chamber 82a). A raw fuel supply channel 84 is opened to the mixed gas supply chamber 78a, and an evaporation return pipe 103 described later is connected to a position in the middle of the raw fuel supply channel 84 (see FIG. 1). The raw fuel supply channel 84 has an ejector function, and generates negative pressure by the flow of the raw fuel for sucking the water vapor.

The raw fuel supply channel 84 is fixed to the second lower ring member 76a and the end ring member 80 by welding or the like. One end of a fuel gas channel 86 is connected to the fuel gas discharge chamber 78b, and the other end of the fuel gas channel 86 is connected to the fuel gas supply passage 44a of the fuel cell stack 24 (see FIG. 1). The fuel gas channel 86 is fixed to the second upper ring member 76b by welding or the like, and extends through the stack attachment plate 62 (see FIG. 2).

An oxygen-containing gas supply pipe 88 is connected to the oxygen-containing gas supply chamber 82a. The oxygen-containing gas supply pipe 88 is fixed to the end ring member 80 by welding or the like. One end of each of, for example, two oxygen-containing gas pipes 90 is provided in the oxygen-containing gas discharge chamber 82b, and the other end of each of the two oxygen-containing gas pipes 90 extends through the stack attachment plate 62, and is connected to the oxygen-containing gas supply passage 42a of the fuel cell stack 24 (see FIG. 1).

As shown in FIGS. 3 and 4, the evaporator 48 has a plurality of evaporation pipes (heat transmission pipes) 96 which are provided along and around the outer circumference of the cylindrical member 70. Each of the evaporation pipes 96 has one end (lower end) fixed to a lower ring member 98a, and the other end (upper end) fixed to an upper ring member 98b.

A lower end ring member 100a is provided below the lower ring member 98a, and an upper end ring member 100b is provided above the upper ring member 98b. The lower end ring member 100a and the upper end ring member 100b are fixed to the outer circumference of the cylindrical member 70 and the inner circumference of the outer member 55 by welding or the like.

An annular water supply chamber 102a is formed between the lower ring member 98a and the lower end ring member 100a, and water is supplied to the water supply chamber 102a. An annular water vapor discharge chamber 102b is formed between the upper ring member 98b and the upper end ring member 100b, and water vapor is discharged to the water vapor discharge chamber 102b. Both ends of each of the evaporation pipes 96 are fixed to the lower ring member 98a and the upper ring member 98b by welding or the like, and opened to the water supply chamber 102a and the water vapor discharge chamber 102b.

The mixed gas supply chamber 78a and the oxygen-containing gas supply chamber 82a are placed inside the inner circumferential portion of the water supply chamber 102a. The water vapor discharge chamber 102b is provided outside the fuel gas discharge chamber 78b at a position offset downward from the fuel gas discharge chamber 78b in the axial direction (downward in the pipe length direction). One end of the evaporation return pipe 103 including at least one of the evaporation pipes 96 is provided in the water vapor discharge chamber 102b, and the other end of the evaporation return pipe 103 is connected to a position in the middle of the raw fuel supply channel 84 (see FIG. 1).

A cylindrical cover member 104 is fixed to the outer circumferential portion of the outer member 55. The center position of the cylindrical cover member 104 is shifted downward. Both of upper and lower ends (both of axial ends) of the cover member 104 are fixed to the outer member 55 by welding or the like, and a heat recovery area (chamber) 106 is formed between the cover member 104 and the outer circumferential portion of the outer member 55.

A plurality of holes 108 are formed circumferentially in a lower marginal end portion of the outer member 55 of the water supply chamber 102a, and the water supply chamber 102a communicates with the heat recovery area 106 through the holes 108. A water supply pipe 110 communicating with the heat recovery area 106 is connected to the cover member 104. An exhaust gas pipe 112 communicating with the third area R3 is connected to an upper portion of the outer member 55.

As shown in FIG. 3, a first combustion gas channel 116a as a passage of the combustion gas is formed in the first area R1, and a second combustion gas channel 116b as a passage of the combustion gas that has passed through the holes 60a is formed in the second area R2. A third combustion gas channel 116c as a passage of the combustion gas that has passed through the openings 72 is formed in the third area R3. Further, a fourth combustion gas channel 116d is formed as a passage after the exhaust gas pipe 112. The second combustion gas channel 116b forms the reformer 46 and the heat exchanger 50, and the third combustion gas channel 116c forms the evaporator 48.

As shown in FIG. 1, the raw fuel supply apparatus 14 includes a raw fuel channel 118. The raw fuel channel 118 is branched into the raw fuel supply channel 84 and the raw fuel supply pipe 58 through a raw fuel regulator valve 120. A desulfurizer 122 for removing sulfur compounds in the city gas (raw fuel) is provided in the raw fuel supply channel 84.

The oxygen-containing gas supply apparatus 16 includes an oxygen-containing gas channel 124. The oxygen-containing gas channel 124 is branched into the oxygen-containing gas supply pipe 88 and the air supply pipe 57 through an oxygen-containing gas regulator valve 126. The water supply apparatus 18 is connected to the evaporator 48 through the water supply pipe 110.

Operation of the fuel cell system 10 will be described below.

At the time of starting operation of the fuel cell system 10, the air (oxygen-containing gas) and the raw fuel are supplied to the start-up combustor 54. More specifically, in the oxygen-containing gas supply apparatus 16, by operation of the air pump, the air is supplied to the oxygen-containing gas channel 124. By adjusting the opening degree of the oxygen-containing gas regulator valve 126, the air is supplied to the air supply pipe 57.

In the meanwhile, in the raw fuel supply apparatus 14, by operation of the fuel gas pump, for example, raw fuel such as the city gas (containing $CH_4$, $C_2H_6$, $C_3H_8$, $C_4H_{10}$) is supplied to the raw fuel channel 118. By regulating the opening degree of the raw fuel regulator valve 120, the raw fuel is supplied into the raw fuel supply pipe 58. The raw fuel is mixed with the air, and supplied into the start-up combustor 54 (see FIGS. 3 and 4).

Thus, the mixed gas of the raw fuel and the air is supplied into the start-up combustor 54, and the mixed gas is ignited to start combustion. Therefore, the combustion gas produced in combustion flows from the first area R1 to the second area R2. Further, the combustion gas is supplied to the third area R3, and then, the combustion gas is discharged to the outside of the fuel cell module 12 through the exhaust gas pipe 112.

As shown in FIGS. 3 and 4, the reformer 46 and the heat exchanger 50 are provided in the second area R2, and the evaporator 48 is provided in the third area R3. Thus, the combustion gas discharged from the first area R1 first heats the reformer 46, next heats the heat exchanger 50, and then heats the evaporator 48.

Then, after the temperature of the fuel cell module 12 is raised to a predetermined temperature, the air (oxygen-containing gas) is supplied to the heat exchanger 50, and the mixed gas of the raw fuel and the water vapor is supplied to the reformer 46.

More specifically, as shown in FIG. 1, the opening degree of the oxygen-containing gas regulator valve 126 is adjusted such that the flow rate of the air supplied to the oxygen-containing gas supply pipe 88 is increased, and the opening degree of the raw fuel regulator valve 120 is adjusted such that the flow rate of the raw fuel supplied to the raw fuel supply channel 84 is increased. Further, by operation of the water supply apparatus 18, the water is supplied to the water supply pipe 110. The air flows from the oxygen-containing gas supply pipe 88 to the oxygen-containing gas supply chamber 82a.

Therefore, as shown in FIGS. 3 and 4, when the air flows into the heat exchanger 50, the air is first supplied to the oxygen-containing gas supply chamber 82a, and thereafter, while the air is moving inside the heat exchange pipes 74, the air is heated by heat exchange with the combustion gas supplied into the second area R2. After the heated air is temporarily supplied to the oxygen-containing gas discharge chamber 82b, the air is supplied to the oxygen-containing gas supply passage 42a of the fuel cell stack 24 through the oxygen-containing gas pipe 90 (see FIG. 1). In the fuel cell stack 24, the heated air flows along the oxygen-containing gas flow field 38, and the air is supplied to the cathode 28.

After the air flows through the oxygen-containing gas flow field 38, the air is discharged from the oxygen-containing gas discharge passage 42b into the oxygen-containing exhaust gas channel 63a. The oxygen-containing exhaust gas channel 63a is opened to the combustion cup 60 of the exhaust gas combustor 52, and the oxygen-containing exhaust gas is supplied into the combustion cup 60.

Further, as shown in FIG. 1, the water from the water supply apparatus 18 is supplied to the evaporator 48. After the raw fuel is desulfurized in the desulfurizer 122, the raw fuel flows through the raw fuel supply channel 84, and moves toward the reformer 46.

In the evaporator 48, water is supplied from the water supply pipe 110 to the heat recovery area 106 of the outer member 55. Therefore, the water is temporarily supplied to the water supply chamber 102a through the holes 108, and thereafter, while the water is moving inside the evaporation pipes 96, the water is heated by the combustion gas flowing through the third area R3, and then vaporized.

After the water vapor flows into the water vapor discharge chamber 102b temporarily, the water vapor is supplied to the evaporation return pipe 103 connected to the water vapor discharge chamber 102b. Thus, the water vapor flows inside the evaporation return pipe 103, and flows into the raw fuel supply channel 84. Then, the water vapor is mixed with the raw fuel supplied by the raw fuel supply apparatus 14 to produce the mixed gas.

The mixed gas from the raw fuel supply channel 84 is temporarily supplied to the mixed gas supply chamber 78a of the reformer 46. The mixed gas moves inside the reforming pipes 66. In the meanwhile, the mixed gas is heated by the combustion gas flowing through the second area R2, and is then steam-reformed. After removal (reforming) of hydrocarbon of $C_{2+}$, a reformed gas chiefly containing methane is obtained.

After this reformed gas is heated, the reformed gas is temporarily supplied to the fuel gas discharge chamber 78b as the fuel gas. Thereafter, the fuel gas is supplied to the fuel gas supply passage 44a of the fuel cell stack 24 through the fuel gas channel 86 (see FIG. 1). In the fuel cell stack 24, the heated fuel gas flows along the fuel gas flow field 40, and the fuel gas is supplied to the anode 30. In the meanwhile, the air is supplied to the cathode 28. Thus, electricity is generated in the electrolyte electrode assembly 32.

After the fuel gas flows through the fuel gas flow field 40, the fuel gas is discharged from the fuel gas discharge passage 44b to the fuel exhaust gas channel 63b. The fuel exhaust gas channel 63b is opened to the inside of the combustion cup 60 of the exhaust gas combustor 52, and the fuel exhaust gas is supplied into the combustion cup 60.

Under the heating operation by the start-up combustor 54, when the temperature of the fuel gas in the exhaust gas combustor 52 exceeds the self-ignition temperature, combustion of the oxygen-containing exhaust gas and the fuel exhaust gas is started inside the combustion cup 60. In the meanwhile, combustion operation by the start-up combustor 54 is stopped.

The combustion cup 60 has the holes 60a. Therefore, as shown in FIG. 3, the combustion gas supplied into the combustion cup 60 flows through the holes 60a from the first area R1 into the second area R2. Then, after the combustion gas is supplied to the third area R3, the combustion gas is discharged to the outside of the fuel cell module 12.

In the first embodiment, the FC peripheral equipment 56 includes the first area R1 where the exhaust gas combustor 52 and the start-up combustor 54 are provided, the annular second area R2 around the first area R1 and where the reformer 46 and the heat exchanger 50 are provided, and the annular third area R3 around the second area R2 and where the evaporator 48 is provided.

That is, the first area R1 is provided at the center, the annular second area R2 is provided around the first area R1, and the annular third area R3 is provided around the second area R2. In the structure, heat waste and heat radiation can be suppressed suitably. Thus, improvement in the heat efficiency is achieved, thermally self-sustaining operation is facilitated, and simple and compact structure of the fuel cell module 12 is achieved as a whole. Thermally self-sustaining operation herein means operation where the operating temperature of the fuel cell 22 is maintained using only heat energy generated in the fuel cell 22 itself, without supplying additional heat from the outside.

Further, in the first embodiment, as shown in FIG. 3, the reformer 46 includes the annular mixed gas supply chamber 78a, the annular fuel gas discharge chamber 78b, the reforming pipes 66, and the second combustion gas channel 116b. The mixed gas is supplied to the mixed gas supply chamber 78a, and the produced fuel gas is discharged into the fuel gas discharge chamber 78b. Each of the reforming pipes 66 has one end connected to the mixed gas supply chamber 78a, and the other end connected to the fuel gas discharge chamber 78b. The second combustion gas channel 116b supplies the combustion gas to the space between the reforming pipes 66.

The heat exchanger 50 includes the annular oxygen-containing gas supply chamber 82a, the annular oxygen-containing gas discharge chamber 82b, the heat exchange pipes 74, and the second combustion gas channel 116b. The oxygen-containing gas is supplied to the oxygen-containing gas supply chamber 82a, and the heated oxygen-containing gas is discharged into the oxygen-containing gas discharge chamber 82b. Each of the heat exchange pipes 74 has one end connected to the oxygen-containing gas supply chamber 82a, and the other end connected to the oxygen-containing gas discharge chamber 82b. The second combustion gas channel 116b supplies the combustion gas to the space between the heat exchange pipes 74.

The evaporator 48 includes the annular water supply chamber 102a, the annular water vapor discharge chamber 102b, the evaporation pipes 96, and the third combustion gas channel 116c. The water is supplied to the water supply chamber 102a, and the water vapor is discharged into the water vapor discharge chamber 102b. Each of the evaporation pipes 96 has one end connected to the water supply chamber 102a, and the other end connected to the water vapor discharge chamber 102b. The third combustion gas channel 116c supplies the combustion gas to the space between the evaporation pipes 96.

As described above, the annular supply chambers (mixed gas supply chamber 78a, oxygen-containing gas supply chamber 82a, and water supply chamber 102a), the annular discharge chambers (fuel gas discharge chamber 78b, oxygen-containing gas discharge chamber 82b, and water vapor discharge chamber 102b) and the pipes (reforming pipes 66, heat exchange pipes 74, and evaporation pipes 96) are provided as basic structure. Thus, simple structure is achieved easily. Accordingly, the production cost of the fuel cell module 12 as a whole is reduced effectively. Further, by changing the volumes of the supply chambers and the discharge chambers, and the length, the diameter, and the number of the pipes, a suitable operation can be achieved depending on various operating conditions, and the design flexibility of the fuel cell module can be enhanced.

Further, the fuel gas discharge chamber 78b, the oxygen-containing gas discharge chamber 82b, and the water vapor discharge chamber 102b are provided at the side of one end adjacent to the fuel cell stack 24, and the mixed gas supply chamber 78a, the oxygen-containing gas supply chamber 82a, and the water supply chamber 102a are provided at the side of the other end distant from the fuel cell stack 24.

In the structure, the reactant gas immediately after heating and the reactant gas immediately after reforming (fuel gas and oxygen-containing gas) can be supplied to the fuel cell stack 24 promptly. Further, the exhaust gas from the fuel cell stack 24 can be supplied to the exhaust gas combustor 52, the reformer 46, the heat exchanger 50, and the evaporator 48 of the FC peripheral equipment 56 while decrease in the temperature of the exhaust gas from the fuel cell stack 24 due to heat radiation is suppressed as much as possible. Thus, improvement in the heat efficiency is achieved, and thermally self-sustaining operation is facilitated.

Further, the fuel gas discharge chamber 78b and the oxygen-containing gas discharge chamber 82b are provided in a double deck manner, and the fuel gas discharge chamber 78b is provided on the inner side with respect to the oxygen-containing gas discharge chamber 82b in the axial direction. The mixed gas supply chamber 78a and the oxygen-containing gas supply chamber 82a are provided in a double deck manner, and the mixed gas supply chamber 78a is provided on the inner side with respect to the oxygen-containing gas supply chamber 82a in the axial direction.

In the structure, the reformer 46 and the heat exchanger 50 can be provided in the second area R2 compactly and efficiently, and reduction in the overall size of the FC peripheral equipment 56 is achieved easily. Further, the fuel gas discharge chamber 78b, which needs to be kept at a high temperature in comparison with the oxygen-containing gas discharge chamber 82b, is provided on the inner side with respect to the oxygen-containing gas discharge chamber 82b in the axial direction. Therefore, the fuel gas discharge chamber 78b is maintained at a desired temperature reliably.

Further, as shown in FIG. 6, in the heat exchanger 50, the heat exchange pipes 74 are provided outside the reforming pipes 66 in the flow directions of the combustion gas in the second combustion gas channel 116b. In the structure, reforming can be performed at higher temperature while suppressing the influence on the raise in the temperature of the oxygen-containing gas. Further, it becomes possible to improve the $H_2$ conversion rate, and suppress production of components of $C_{2+}$ or higher.

Further, at least one of the evaporation pipes 96 forms the evaporation return pipe 103 connecting the water vapor discharge chamber 102b to the mixed gas supply chamber 78a. In the structure, the water vapor flowing through the evaporation return pipe 103 is kept at high temperature, and mixed with the raw fuel in the mixed gas supply chamber 78a of the reformer 46 to produce the mixed gas. Therefore, improvement in the reforming operation is achieved.

Further, the water vapor discharge chamber 102b is provided at a different position from the fuel gas discharge chamber 78b and the oxygen-containing gas discharge chamber 82b in the pipe length direction. Therefore, it becomes possible to produce the fuel cell module 12 easily and efficiently.

Further, as shown in FIG. 3, the combustion gas flows from the first area R1 to the second area R2, and then, flows from the second area R2 to the third area R3. Thereafter, the combustion gas is discharged to the outside of the fuel cell module 12. In the structure, the heat can be supplied to the exhaust gas combustor 52, the reformer 46, the heat exchanger 50, and the evaporator 48 of the FC peripheral equipment 56 effectively. Thus, improvement in the heat efficiency is achieved, and thermally self-sustaining operation is facilitated.

Further, the fuel cell module 12 is a solid oxide fuel cell module. Therefore, the fuel cell module 12 is suitable for, in particular, high temperature type fuel cells such as SOFC.

Figure 7:
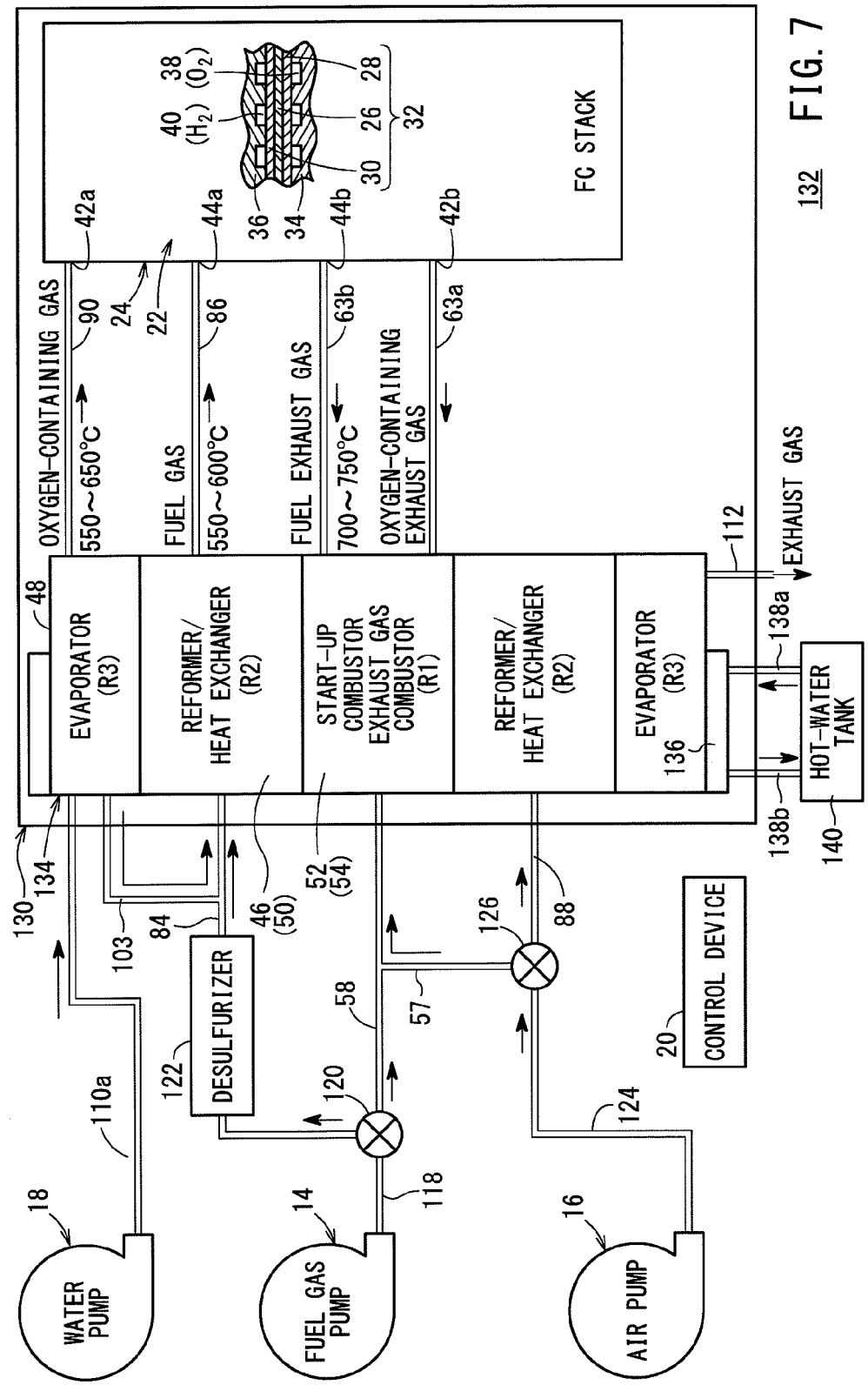
FIG. 7 is a diagram schematically showing structure of a fuel cell system including a fuel cell module according to a second embodiment of the present invention.

FIG. 7 is a diagram schematically showing structure of a fuel cell system 132 including a fuel cell module 130 according to a second embodiment of the present invention.

The constituent elements of the fuel cell module including the fuel cell module according to the second embodiment of the present invention that are identical to those of the fuel cell system 10 including the fuel cell module 12 according to the first embodiment are labeled with the same reference numerals, and the descriptions thereof will be omitted. The same applies to a third embodiment to be described later, and thus the descriptions thereof will be omitted.

Figure 8:
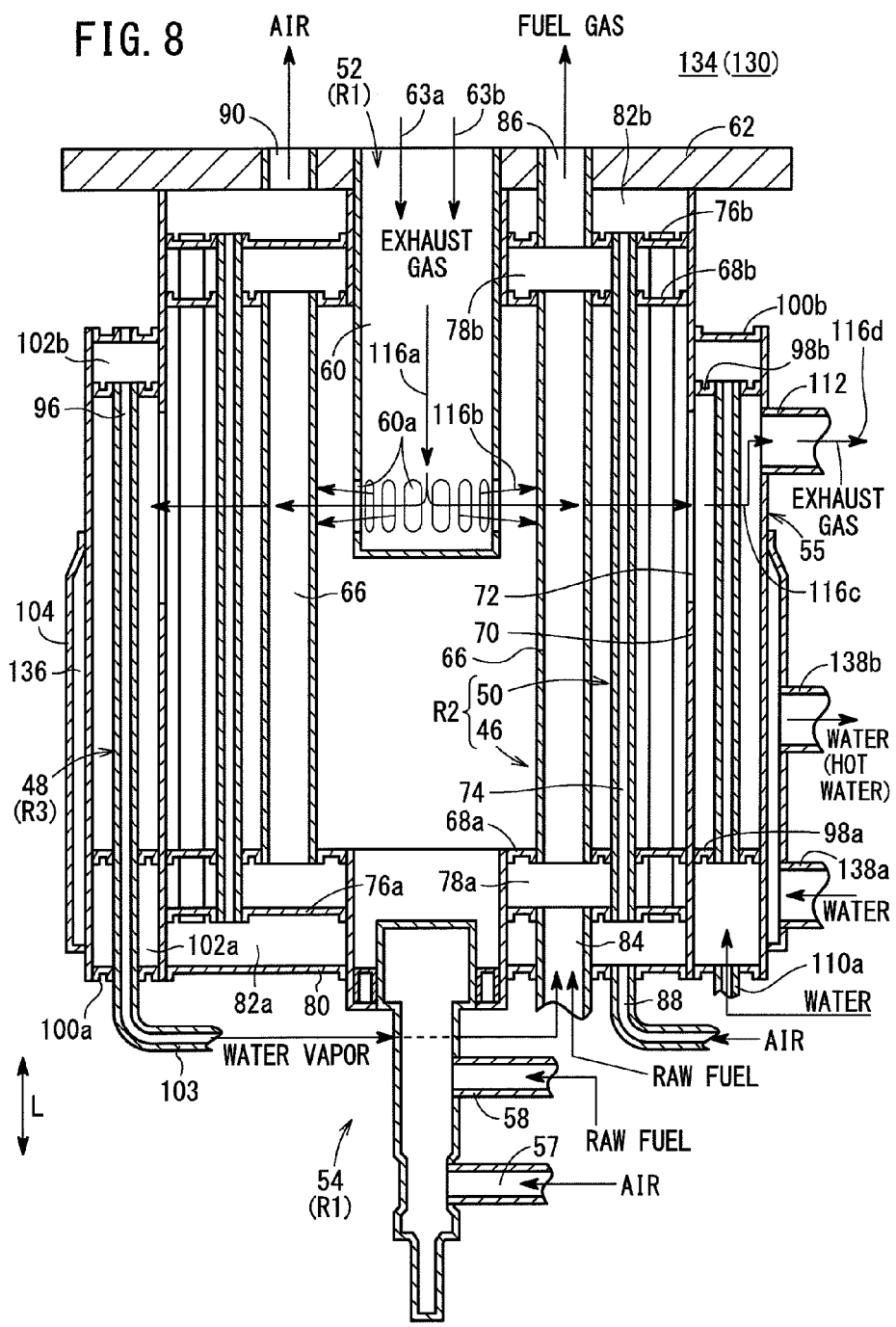
FIG. 8 is a cross sectional view showing FC peripheral equipment of the fuel cell module.

As shown in FIGS. 7 and 8, FC peripheral equipment 134 of the fuel cell module 130 includes a heat recovery area 136 around the third area R3. As shown in FIG. 8, the heat recovery area 136 is formed independently of the water supply chamber 102a (i.e., such that the heat recovery area 136 is in non-communication with the water supply chamber 102a). That is, the holes 108 are not provided in the lower marginal end portion of the outer member 55.

The water supply pipe 110a of the water supply apparatus 18 is directly connected to the water supply chamber 102a. A hot-water tank 140 is connected to the heat recovery area 136 through a water supply channel 138a and a water discharge channel 138b. For example, the hot-water tank 140 is used as a hot water supply for home use. Water is supplied as fluid to the heat recovery area 136.

In the second embodiment, the water in the hot-water tank 140 is supplied to the heat recovery area 136. After the water is heated by the combustion gas supplied to the third area R3, the water flows through the water discharge channel 138b, and the water is returned to the hot-water tank 140. Therefore, the hot water heated to a predetermined temperature is stored in the hot-water tank 140, and the hot water is taken out from the hot-water tank 140 as necessary.

In the second embodiment, water is supplied from the outside of the fuel cell module 130 to the heat recovery area 136. Therefore, it becomes possible to achieve heat insulation for suppressing heat radiation and heat waste from the fuel cell module 130. Further, since the water (e.g., hot water) supplied from the outside of the fuel cell module 130 is heated suitably, improvement in the heat efficiency is achieved easily.

Figure 9:
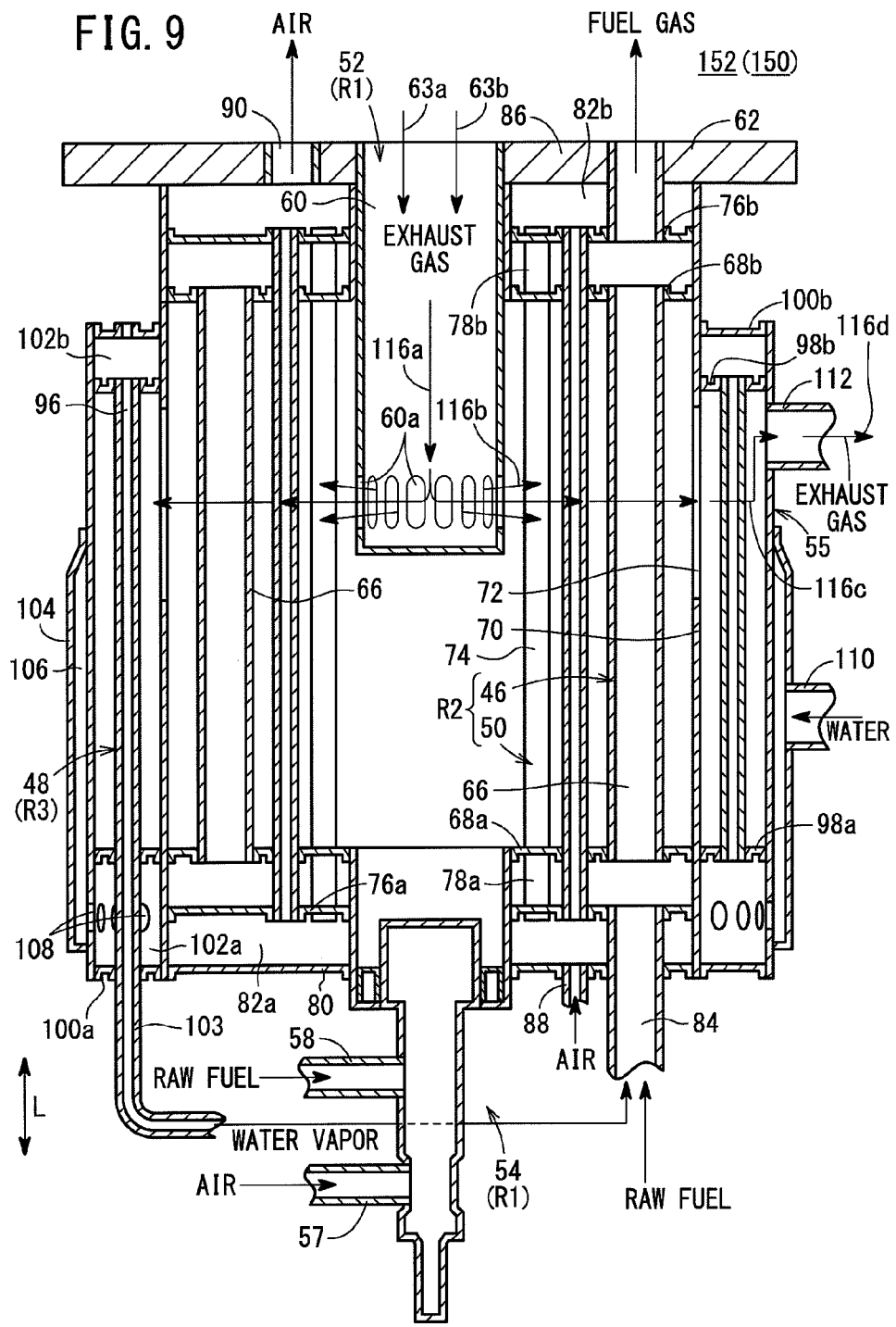
FIG. 9 is a cross sectional view showing FC peripheral equipment of a fuel cell module according to a third embodiment of the present invention.

FIG. 9 is a cross sectional view showing FC peripheral equipment 152 of a fuel cell module 150 according to the third embodiment of the present invention.

Figure 10:
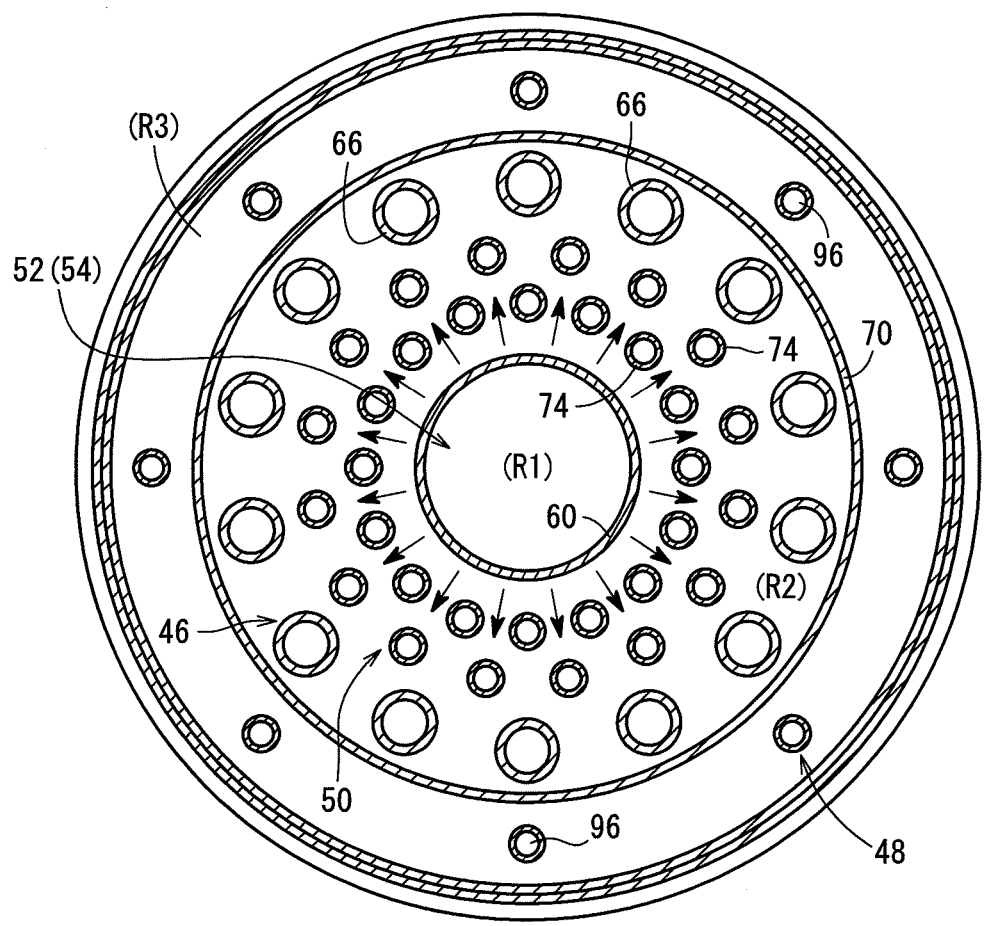
FIG. 10 is a cross sectional view showing the FC peripheral equipment.
Figure 11:
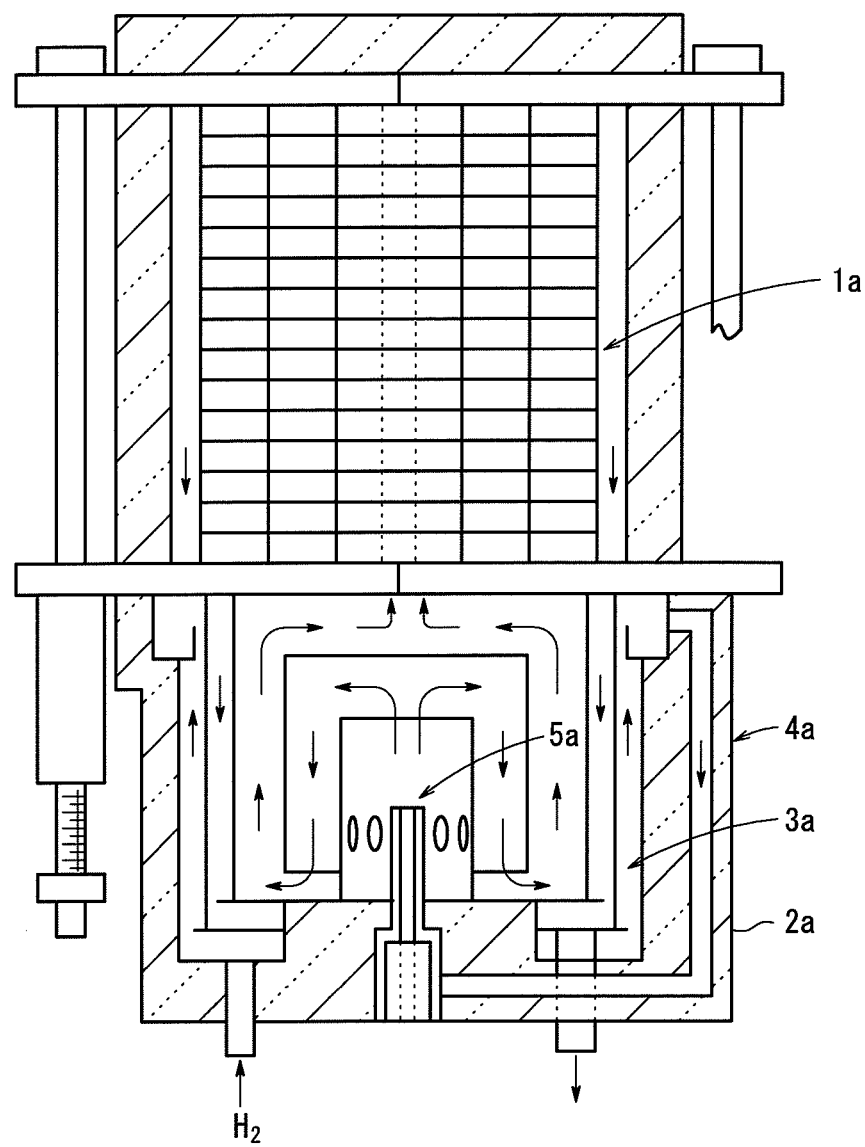
FIG. 11 is a view schematically showing a fuel cell battery disclosed in a conventional technique 1.
Figure 12:
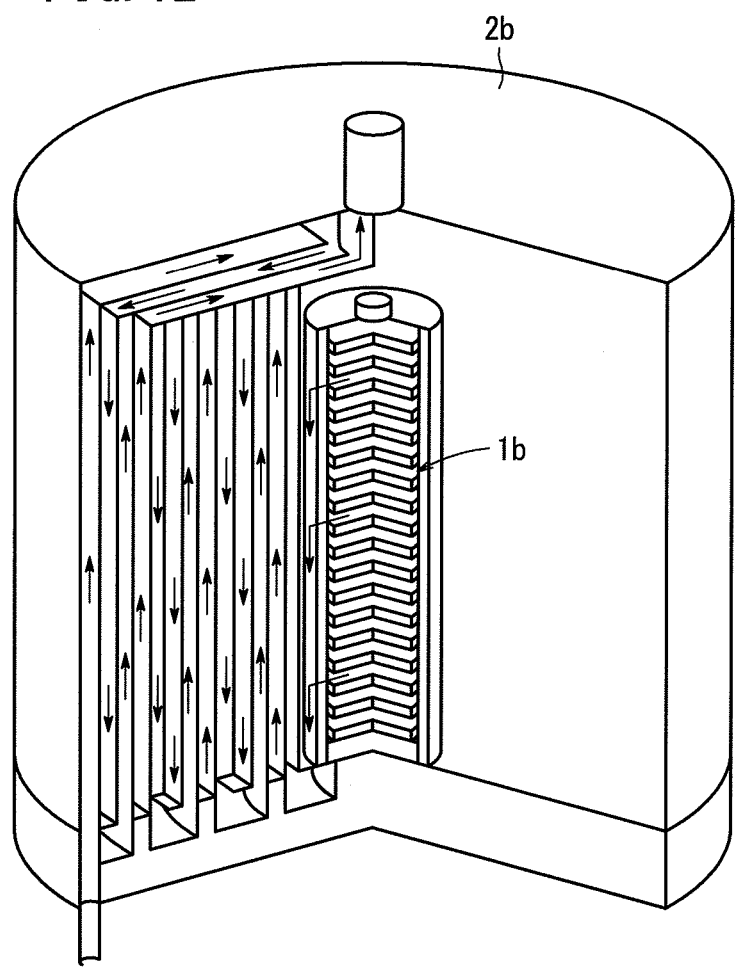
FIG. 12 is a perspective view with partial cutout showing a solid oxide fuel cell disclosed in a conventional technique 2.
Figure 13:
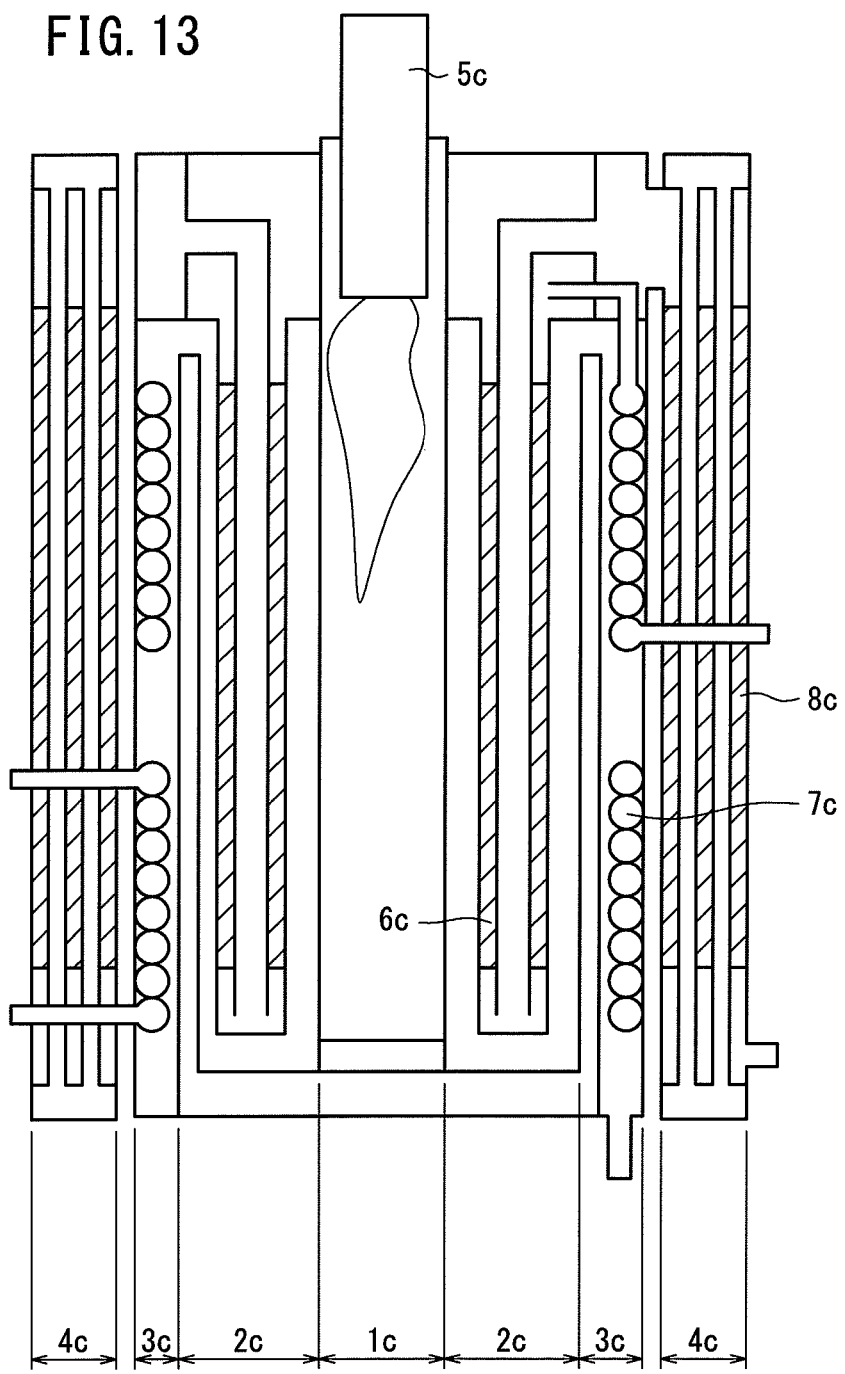
FIG. 13 is a view schematically showing a fuel cell system disclosed in a conventional technique 3.

As shown in FIGS. 9 and 10, in the FC peripheral equipment 152, in the second area R2, the reformer 46 is provided radially outwardly relative to the heat exchanger 50. The heat exchanger 50 includes heat exchange pipes 74 arranged in a zigzag pattern on two virtual circles concentrically around the first area R1. The reformer 46 includes reforming pipes 66 arranged on a virtual circle outside the heat exchange pipes 74 and concentrically around the first area R1.

In the third embodiment, the same advantages as in the case of the first embodiment are obtained. The third embodiment may adopt the same structure as the structure of the second embodiment.

While the invention has been particularly shown and described with reference to preferred embodiments, it will be understood that variations and modifications can be effected thereto by those skilled in the art without departing from the scope of the invention as defined by the appended claims.

The invention claimed is:

1. A fuel cell module comprising:
a fuel cell stack formed by stacking a plurality of fuel cells for generating electricity by electrochemical reactions of a fuel gas and an oxygen-containing gas;
a reformer for reforming a mixed gas of a raw fuel chiefly containing hydrocarbon and water vapor to produce the fuel gas supplied to the fuel cell stack;
an evaporator for evaporating water, and supplying the water vapor to the reformer;
a heat exchanger for raising a temperature of the oxygen-containing gas by heat exchange with a combustion gas, and supplying the oxygen-containing gas to the fuel cell stack;
an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas; and
a start-up combustor for combusting the raw fuel and the oxygen-containing gas to produce the combustion gas,
wherein the fuel cell module includes:
a first area where the exhaust gas combustor and the start-up combustor are provided;
an annular second area around the first area and where the reformer and the heat exchanger are provided; and
an annular third area around the second area and where the evaporator is provided.

2. The fuel cell module according to claim 1, wherein the reformer includes an annular mixed gas supply chamber to which the mixed gas is supplied, an annular fuel gas discharge chamber to which the produced fuel gas is discharged, a plurality of reforming pipes each having one end connected to the mixed gas supply chamber, and another end connected to the fuel gas discharge chamber, and a combustion gas channel for supplying the combustion gas to spaces between the reforming pipes;
the evaporator includes an annular water supply chamber to which the water is supplied, an annular water vapor discharge chamber to which the water vapor is discharged, a plurality of evaporation pipes each having one end connected to the water supply chamber, and another end connected to the water vapor discharge chamber, and a combustion gas channel for supplying the combustion gas to spaces between the evaporation pipes; and
the heat exchanger includes an annular oxygen-containing gas supply chamber to which the oxygen-containing gas is supplied, an annular oxygen-containing gas discharge chamber to which the heated oxygen-containing gas is discharged, a plurality of heat exchange pipes each having one end connected to the oxygen-containing gas supply chamber, and another end connected to the oxygen-containing gas discharge chamber, and a combustion gas channel for supplying the combustion gas to spaces between the heat exchange pipes.

3. The fuel cell module according to claim 2, wherein the fuel gas discharge chamber, the water vapor discharge chamber, and the oxygen-containing gas discharge chamber are provided at one end side adjacent to the fuel cell stack; and
the mixed gas supply chamber, the water supply chamber, and the oxygen-containing gas supply chamber are provided at another end side distant from the fuel cell stack.

4. The fuel cell module according to claim 2, wherein the fuel gas discharge chamber and the oxygen-containing gas discharge chamber are provided in a double deck manner, and the fuel gas discharge chamber is provided on an inner side with respect to the oxygen-containing gas discharge chamber in an axial direction; and
the mixed gas supply chamber and the oxygen-containing gas supply chamber are provided in a double deck manner, and the mixed gas supply chamber is provided on an inner side with respect to the oxygen-containing gas supply chamber in the axial direction.

5. The fuel cell module according to claim 2, wherein, in the heat exchanger, the heat exchange pipes are provided outside the reforming pipes in flow directions of the combustion gas in the combustion gas channel.

6. The fuel cell module according to claim 2, wherein at least one of the evaporation pipes forms an evaporation return pipe for connecting the water vapor discharge chamber to the mixed gas supply chamber.

7. The fuel cell module according to claim 2, wherein the water vapor discharge chamber is provided at a different position from the fuel gas discharge chamber and the oxygen-containing gas discharge chamber in a pipe length direction.

8. The fuel cell module according to claim 1, wherein the combustion gas first flows from the first area to the second area, next flows from the second area to the third area, and then the combustion gas is discharged to outside of the fuel cell module.

9. The fuel cell module according to claim 1, wherein the fuel cell module is a solid oxide fuel cell module.

* * * * *